UNITED STATES PATENT OFFICE.

JUDSON A. DE CEW, OF MOUNT VERNON, NEW YORK, ASSIGNOR TO PROCESS ENGINEERS, INCORPORATED, OF NEW YORK, N. Y., A CORPORATION OF NEW YORK.

METHOD OF MAKING EMULSIONS.

1,370,884.      Specification of Letters Patent.      Patented Mar. 8, 1921.

No Drawing.      Application filed November 11, 1920. Serial No. 423,398.

*To all whom it may concern:*

Be it known that I, JUDSON A. DE CEW, a citizen of the Dominion of Canada, residing in Mount Vernon, in the county of Westchester and State of New York, have invented certain new and useful Improvements in Methods of Making Emulsions, of which the following is a specification.

In the practice of preparing free rosin soaps, it is necessary to dilute the soaps with considerable portion of water before they are added to the beating engine because these soaps are not soluble directly in the cold water of the beater and will not dissolve without decomposition in the beater even if the water therein is hot.

The amount of free rosin in a soap which can be diluted without decomposition depends upon the method by which dilution takes place. The more accurately the process of dilution at the critical proportions necessary and the more intense the rate of solution, the higher the amount of free rosin can be used.

In order to prepare high free rosin size by a partial state of dilution so that it can be further mixed with cold water without decomposition, it is necessary to use definite proportions of water for the first stage of dilution.

Rosin size as it is ordinarily known may contain anywhere from 20% to 50% of water and the average size in use will contain around 30% to 40% of water. In diluting rosin size, we are only required to deal with rosin soaps with this limit of variation of water content.

When these rosin soaps contain but a small amount of unsaponified rosin, they can be diluted with various proportions of hot water without decomposition but as the proportion of free rosin increases, the proportion of hot water used must be more accurately controlled.

If a high free rosin size is diluted in hot water until it contains 15% total solids and it is then mixed with cold water some separation of free rosin will take place. In order to avoid decomposition therefore, it is necessary to dilute the rosin size to a point below 15% total solids before it is further diluted in cold water.

I have demonstrated that any high free rosin size, before it can be mixed with cold water without decomposition, must first be diluted with hot water by special means, to a point where it contains less than 15% total solids.

The test of the perfect method is the ability to dilute a size containing as much as 50% free rosin and have no separation of rosin in the form of visible particles.

Any method that will do this will deal with any lower percentage of free rosin without difficulty.

I have arrived by long experience, at the best proportions of hot water to be used under various circumstances. For example:

A hot rosin size containing a considerable amount of free rosin and containing 20% of water should be diluted with violent agitation with approximately ten parts of hot water to one of size and then mixed with cool water to the right degree of final dilution. The size containing 30% of water and 70% of size would be diluted under the same conditions with approximately eight parts of water to one of size. A size containing 40% of water could be diluted with seven parts of water to one of size. A size containing 50% of water could be diluted with six parts of water to one of size.

It is found, therefore, that an approximate ratio of twelve parts of water to one of dry size or approximately an 8% solution of size in hot water, can be diluted with cold water without separation of free rosin. In order to escape the critical stages of decomposition, a hot free rosin size must be diluted instantaneously from a condition where it contains 30% to 40% of water to one in which the ratio of dry size to water is approximately one to twelve.

In order to accomplish this satisfactorily, the agitation must be violent and the temperature of water must be above 175° F.

The minimum amount of water which could possibly be used satisfactorily would be five parts of water to one of a 60% size and the maximum amount of water would be around twelve parts of water to one of 60% size. If a size is diluted with hot water as above described, and is not chilled to a stabilizing temperature by the addition of colder water, it will gradually decompose with the formation of rosin sediments, which have no sizing value. The hot sizing solution containing around 8% of undecomposed rosin size, can be mixed with cold water without any special means of agitation, and the more dilute it is made, the more stable it becomes.

What I claim is:

1. A method of diluting hot rosin soap containing free rosin which consists in violently agitating hot size in contact with hot water in the proportion of approximately seven parts of water to one of size, and then producing further dilution by mixing it with colder water.

2. A method of diluting hot rosin soap containing free rosin which consists in violently agitating hot size in contact with hot water at a temperature above 175° F. in the proportions of approximately seven parts of water to one of size and finally increasing the dilution by discharging the partially diluted liquid into colder water.

3. A method for diluting the highest possible free rosin size, without separation of free rosin which consists in mixing instantaneously a hot size, containing from 20 to 50% of water, with hot water at a temperature about 175° F. to produce approximately an 8% solution and then diluting with colder water.

In testimony whereof I have affixed my signature to this specification.

JUDSON A. DE CEW.